(No Model.)

S. GILZINGER.
STORE FIXTURE.

No. 357,918. Patented Feb. 15, 1887.

WITNESSES:
Chas. Nida
D. A. Carpenter

INVENTOR
Sebastian Gilzinger,
BY
ATTORNEY

UNITED STATES PATENT OFFICE.

SEBASTIAN GILZINGER, OF RONDOUT, NEW YORK, ASSIGNOR TO ABEL A. CROSBY, OF SAME PLACE.

STORE-FIXTURE.

SPECIFICATION forming part of Letters Patent No. 357,918, dated February 15, 1887.

Application filed October 7, 1886. Serial No. 215,521. (No model.)

*To all whom it may concern:*

Be it known that I, SEBASTIAN GILZINGER, of Rondout, in the county of Ulster and State of New York, have invented a certain new and useful Improvement in Store-Fixtures, of which I declare the following to be a full, clear, and exact specification, reference being had to the accompanying drawings forming a part thereof.

This invention has for its object an improvement in store-fixtures; and the invention consists in a series of receptacles for goods, constructed, arranged, and combined substantially in the manner hereinafter shown, described, and claimed.

Figure 1:
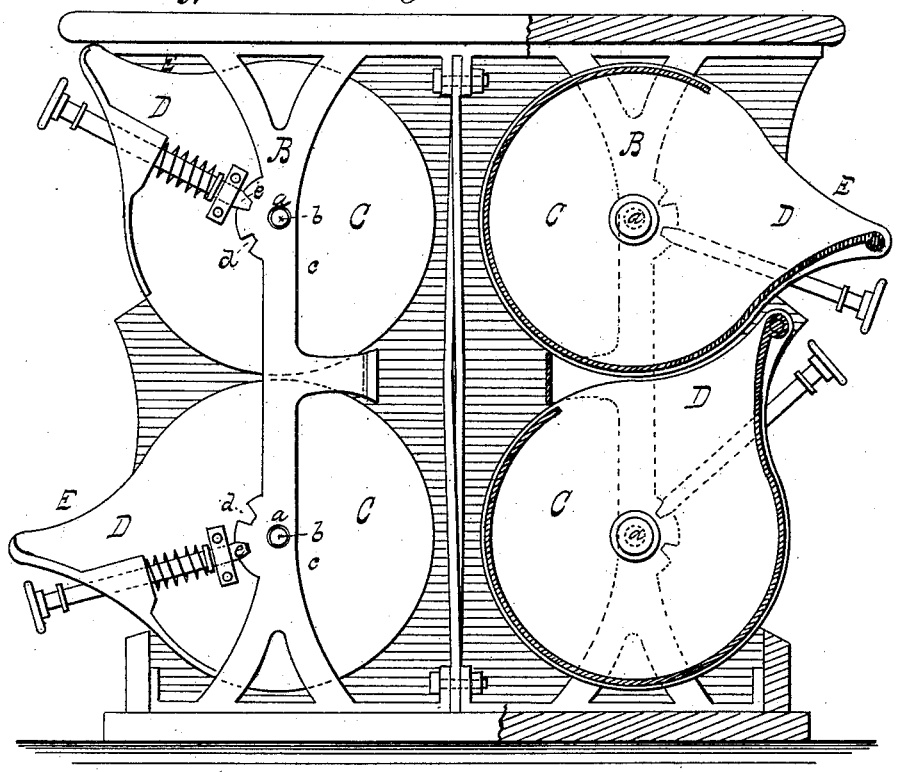
Figure 2:
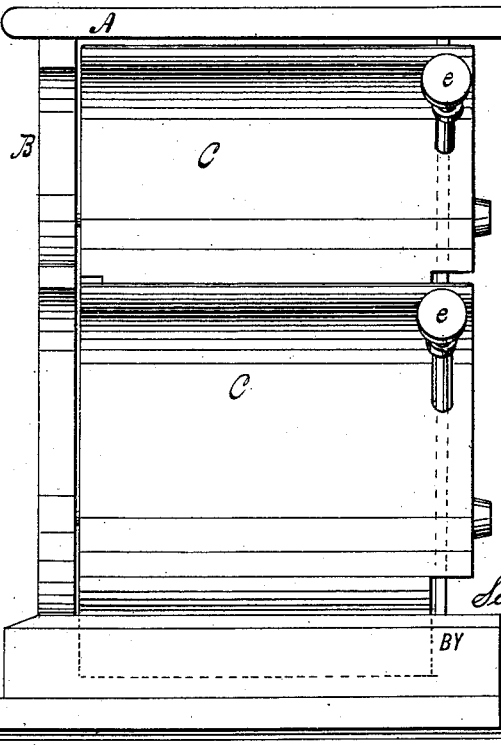

In the accompanying sheet of drawings, Figure 1 is an end view, partly in section, of my store-fixture. Fig. 2 is a side elevation of the same.

Similar letters of reference indicate like parts in the several figures.

To economize space in storing and time in handling store goods, or such as consist of an aggregation of separate things commonly found in hardware-stores, in the shape of nails, screws, and bolts, in druggists' shops, grains, roots, gums, &c., and in grocers' shops, tea, sugar, spices, &c., is the principal object of my invention; and to that end I arrange beneath the counter A, or in any other convenient manner, supporting frame-work B, preferably made of metal. In this frame-work are formed suitable bearings, a, the bearings in one part of the frame-work being opposite the bearings in the other. Between this frame-work B, or the uprights of the same, are fitted bins C, having the general shape of hollow cylinders entirely closed, excepting at D, where the cylindrical shape is departed from to form a flaring and open mouth, E. These bins are each of them provided with journals b, fixed centrally to the heads c of the bins, and these journals are received into the bearings a of the frame-work B, so that each bin can be freely revolved within certain limits. When the bins are arranged in rows one above another, as is shown in the drawings, the shape of the open mouths E of the upper row is such as will cause them to be closed by the under side of the top of the counter, or shelf, or cabinet which incloses them, and of the lower row of bins the shape of the mouths permits of their being closed by the cylindrical surface of the bins next above them, as in Figs. 1 and 2.

Each upright of the frame-work B may be provided with notches d, and one head of each bin may have a spring-dog, e, to engage with these notches when required; but the matter of these notches and spring-dogs is not very material, since, as is obvious, any suitable catch or holding device may be substituted for them.

The construction of the fixture being substantially that above described, it is operated by filling the bins with goods desired, withdrawing the dog e from one of the notches d which holds the bin in the open position, and then simply turning the bin up until the mouth of the bin is closed by the under side of the counter-top, or, as in the case of a lower bin, by the bin next above it. This keeps out the dust, and the dog e having now entered the upper one of the notches d the bin is kept in the closed position until it is opened by withdrawing the dog revolving the bin until the open side or mouth is horizontal, as in Fig. 1, when the goods can be taken from the bin, as required, with much facility, since there is no front side, as in a drawer, to interfere with the use of a scoop or iron claw when employed for that purpose.

Having thus described my invention, what I claim as new, and desire to secure by Letters Patent, is—

A store-fixture consisting of a series of turning bins, substantially cylindrical in cross-section, pivoted coincident with the longest axis of the cylinders, the several bins having scoop-shaped mouths E, and being placed above each other and also side by side, whereby the upper range of bins close the open sides of the lower range of bins, as and for the purpose described.

SEBASTIAN GILZINGER.

In presence of—
F. R. POWHIP,
JOHN T. ROWLAND,